(12) United States Patent
Beaufrere et al.

(10) Patent No.: US 12,728,702 B2
(45) Date of Patent: Sep. 8, 2026

(54) SYSTEM AND METHOD FOR CONTROLLING OPERATION OF A TRANSPORT REFRIGERATION UNIT IN A VEHICLE

(71) Applicant: Carrier Corporation, Palm Beach Gardens, FL (US)

(72) Inventors: Florian Beaufrere, Rouen (FR); Guillaume Charoulet, Rouen (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 260 days.

(21) Appl. No.: 18/738,199

(22) Filed: Jun. 10, 2024

(65) Prior Publication Data

US 2024/0416726 A1 Dec. 19, 2024

Related U.S. Application Data

(60) Provisional application No. 63/508,935, filed on Jun. 19, 2023.

(51) Int. Cl.
*B60H 1/32* (2006.01)

(52) U.S. Cl.
CPC ......... *B60H 1/3211* (2013.01); *B60H 1/3229* (2013.01); *B60H 1/3232* (2013.01)

(58) Field of Classification Search
CPC .. B60H 1/3211; B60H 1/3229; B60H 1/3232; B60H 2001/3272; F25B 2500/22;
(Continued)

(56) References Cited

U.S. PATENT DOCUMENTS 9,889,724 B2 2/2018 Chen et al.
9,920,971 B2 3/2018 Jin et al.
(Continued)

FOREIGN PATENT DOCUMENTS

CN 104602926 B 9/2017
EP 4044084 A1 8/2022
WO 2015135015 A1 9/2015

OTHER PUBLICATIONS

EPO search and allowability opinion, 2024.*
Extended European Search Report received for EP Application No. 24183194.0, mailed on Nov. 22, 2024, 4 Pages.

*Primary Examiner* — Henry T Crenshaw
(74) *Attorney, Agent, or Firm* — Souad Hakim

(57) ABSTRACT

Embodiments of the disclosure describe systems and methods for controlling operation of a Transport Refrigeration Unit (TRU) of a vehicle, the vehicle comprising a container configured to store cargo. The method comprises receiving first input information from at least one sensor positioned inside the container. Further, the method comprises determining a current amount of cargo load in the container based on the received first input information from the at least one sensor. Furthermore, the method comprises controlling operation of the TRU by setting one or more temperature regulation parameters for the container based on the determined current amount of cargo load in the container. Further, the operation of the TRU is controlled by triggering a specific type of security mode, among a plurality of modes, in response to detecting a type of refrigerant leak in the vehicle.

18 Claims, 6 Drawing Sheets

(58) Field of Classification Search
CPC ............ F25B 2700/2104; F25B 49/005; F25B 49/02; F25D 11/003; F25D 2600/06; F25D 2700/06; F25D 29/006
See application file for complete search history.

(56) References Cited

U.S. PATENT DOCUMENTS

| | | | | |
|---|---|---|---|---|
| 9,950,590 | B2 | 4/2018 | Bryant et al. | |
| 10,152,063 | B2 | 12/2018 | Anderson et al. | |
| 10,488,245 | B2 | 11/2019 | Gelada Camps et al. | |
| 11,087,485 | B2 | 8/2021 | Ehrman et al. | |
| 11,130,387 | B2 | 9/2021 | Adetola et al. | |
| 11,151,506 | B2 | 10/2021 | Kilburn et al. | |
| 11,155,143 | B2 | 10/2021 | Adetola et al. | |
| 11,176,512 | B2 | 11/2021 | Siris | |
| 11,274,879 | B2 | 3/2022 | Meyers | |
| 11,299,219 | B2 | 4/2022 | Raasch et al. | |
| 2008/0272906 | A1* | 11/2008 | Breed | B60R 21/01538 340/539.11 |
| 2008/0272923 | A1 | 11/2008 | Breed | |
| 2012/0198866 | A1* | 8/2012 | Zeidner | F25D 11/003 62/89 |
| 2018/0181126 | A1* | 6/2018 | Seaman | B60W 60/00256 |
| 2020/0106271 | A1* | 4/2020 | Rydkin | B60H 1/00428 |
| 2020/0180404 | A1* | 6/2020 | Chen | B60R 16/033 |
| 2020/0180496 | A1* | 6/2020 | Burchill | F25B 27/00 |
| 2020/0207185 | A1* | 7/2020 | Saroka | H01M 10/48 |
| 2021/0215418 | A1 | 7/2021 | Nash | |
| 2021/0381822 | A1 | 12/2021 | Burns et al. | |
| 2022/0003872 | A1 | 1/2022 | Uchimura et al. | |
| 2022/0092962 | A1 | 3/2022 | Grinshtain | |
| 2022/0366556 | A1 | 11/2022 | Meckesheimer et al. | |

* cited by examiner

SYSTEM AND METHOD FOR CONTROLLING OPERATION OF A TRANSPORT REFRIGERATION UNIT IN A VEHICLE

CROSS REFERENCE TO RELATED APPLICATION

This application claims the benefit of U.S. Provisional Patent Application No. 63/508,935 filed on Jun. 19, 2023, which is incorporated by reference herein in its entirety.

FIELD OF THE INVENTION

The disclosure generally relates to the field of transport refrigeration systems, and more particularly, relates to systems and methods for controlling operation of a transport refrigeration unit (TRU) in a transport vehicle.

BACKGROUND

Freight containers, which are also referred to as cargo containers or intermodal containers, are designed to be used across various modes of transportation, such as ships, railroads, or trucks. These containers are standardized and enable efficient transport of goods. Refrigerated freight containers are specifically used to transport cargo loads that require temperature regulation, such as perishable food or pharmaceuticals.

Currently, for transportation of goods, when the cargo is loaded into a container, a refrigeration system associated with the container operates with a standard setting manually set by a user. In an example, the refrigeration system may be operated based on a temperature difference between a set point and a temperature control. However, such a traditional approach may often lead to temperature overshooting and poor regulation around the set point, as the refrigeration system operates at full capacity irrespective of the cargo load present in the cargo container.

Additionally, for operational safety of the aforementioned containers, one or more safety devices (e.g., a safety sensor) are often installed in the cargo containers to monitor any refrigerant leaks in real-time. However, even with the advent of intermediate flammability or higher flammability refrigerants, such as A2L or A3, the current refrigeration systems are designed to consider a low flammability limit for the safety devices. Consequently, such safety devices may generate an excessive number of triggers for A2L or A3 refrigerant leaks, resulting in excessive halting of vehicles carrying the cargo containers.

Accordingly, there is a need for efficient refrigeration systems and methods to overcome the aforementioned challenges.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

Disclosed herein is a method for controlling operation of a Transport Refrigeration Unit (TRU) of a vehicle, the vehicle comprising a container configured to store cargo. The method comprises receiving first input information from at least one sensor positioned inside the container. Further, the method comprises determining a current amount of cargo load in the container based on the received first input information from the at least one sensor. Furthermore, the method comprises controlling operation of the TRU by setting one or more temperature regulation parameters for the container based on the determined current amount of cargo load in the container.

In one or more embodiments, the determining comprises determining the current amount of cargo load in the container based on a distance of one or more objects associated with the cargo load from a position of the at least one sensor inside the container, wherein the distance is determined based on a time of flight measurement of a signal transmitted from the at least one sensor towards the one or more objects associated with the cargo load.

In one or more embodiments, controlling operation of the TRU comprises setting the one or more temperature regulation parameters by controlling operation of at least one of a compressor, a modular flow suction valve, a modular flow expansion valve, a bypass valve, and an evaporator fan in the TRU of the vehicle.

In one or more embodiments, the method further comprises receiving second input information from at least one refrigerant sensor positioned inside the container, the second input information being indicative of a current concentration level of a type of a refrigerant being used in the vehicle. Furthermore, the method comprises processing the second input information to determine whether the current concentration level of the type of the refrigerant is more than a predefined threshold concentration level for the type of the refrigerant.

In one or more embodiments, controlling operation of the TRU further comprises selecting a security mode among a plurality of security modes, wherein each security mode of the plurality of security modes is indicative of a specific security trigger mechanism based on the determined current amount of the cargo load in the container and a determination that the current concentration level is more than the predefined threshold concentration level.

In one or more embodiments, the plurality of security modes comprises an alarm based first security trigger mechanism, a second security trigger mechanism involving shutting down of the TRU, and a third security trigger mechanism for pumping down the refrigerant.

In one or more embodiments, the at least one sensor comprises a 3D light detection and ranging (LiDAR) sensor, a return air sensor, and a supply air sensor.

In one or more embodiments, the method further comprises receiving third input information associated with a current trip route and a current location of the vehicle, wherein controlling operation of the TRU comprises setting the one or more temperature regulation parameters for the container based on the determined current amount of the cargo load and the third input information.

In one or more embodiments, the method further comprises receiving fourth input information associated with a cargo weight and a cargo type inside the container of the vehicle, wherein controlling operation of the TRU comprises setting the one or more temperature regulation parameters for the container based on the fourth input information.

Also disclosed herein is a system for controlling operation of a Transport Refrigeration Unit (TRU) of a vehicle, the vehicle comprising a container configured to store cargo. The system comprises at least one sensor positioned inside the container of the vehicle, and at least one processor communicably coupled to the at least one sensor. The at least one processor is configured to receive first input information from the at least one sensor positioned inside the container. The at least one processor is further configured to determine a current amount of cargo load in the container based on the received first input information from the at least one sensor. The at least one processor is further configured to control operation of the TRU by setting one or more temperature regulation parameters for the container based on the determined current amount of cargo load in the container.

In one or more embodiments, the at least one processor is further configured to determine the current amount of cargo load in the container based on a distance of one or more objects associated with the cargo load from a position of the at least one sensor inside the container, wherein the distance is determined based on a time of flight measurement of a signal transmitted from the at least one sensor towards the one or more objects associated with the cargo load.

In one or more embodiments, the at least one processor is further configured to control operation of the TRU by setting the one or more temperature regulation parameters based on controlling operation of at least one of a compressor, a modular flow suction valve, a modular flow expansion valve, a bypass valve, and an evaporator fan in the TRU of the vehicle.

In one or more embodiments, the at least one processor is further configured to receive second input information from at least one refrigerant sensor positioned inside the container, the second input information being indicative of a current concentration level of a type of a refrigerant being used in the vehicle. Furthermore, the at least one processor is configured to process the second input information to determine whether the current concentration level of the type of the refrigerant is more than a predefined threshold concentration level for the type of the refrigerant.

In one or more embodiments, to control operation of the TRU, the at least one processor is further configured to select a security mode among a plurality of security modes, wherein each security mode of the plurality of security modes is indicative of a specific security trigger mechanism based on the determined current amount of the cargo load in the container and a determination that the current concentration level is more than the predefined threshold concentration level.

In one or more embodiments, the plurality of security modes comprises an alarm based first security trigger mechanism, a second security trigger mechanism involving shutting down of the TRU, and a third security trigger mechanism for pumping down the refrigerant.

In one or more embodiments, the at least one sensor comprises a 3D light detection and ranging (LiDAR) sensor, a return air sensor, and a supply air sensor.

In one or more embodiments, the least one processor is further configured to receive third input information associated with a current trip route and a current location of the vehicle; and control operation of the TRU by setting the one or more temperature regulation parameters for the container based on the determined current amount of the cargo load and the third input information.

In one or more embodiments, the least one processor is further configured to receive fourth input information associated with a cargo weight and a cargo type inside the container of the vehicle, and control the operation of the TRU by setting the one or more temperature regulation parameters for the container based on the fourth input information.

To further clarify the advantages and features of the methods, systems, and apparatuses, a more particular description of the methods, systems, and apparatuses will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

Figure 1:
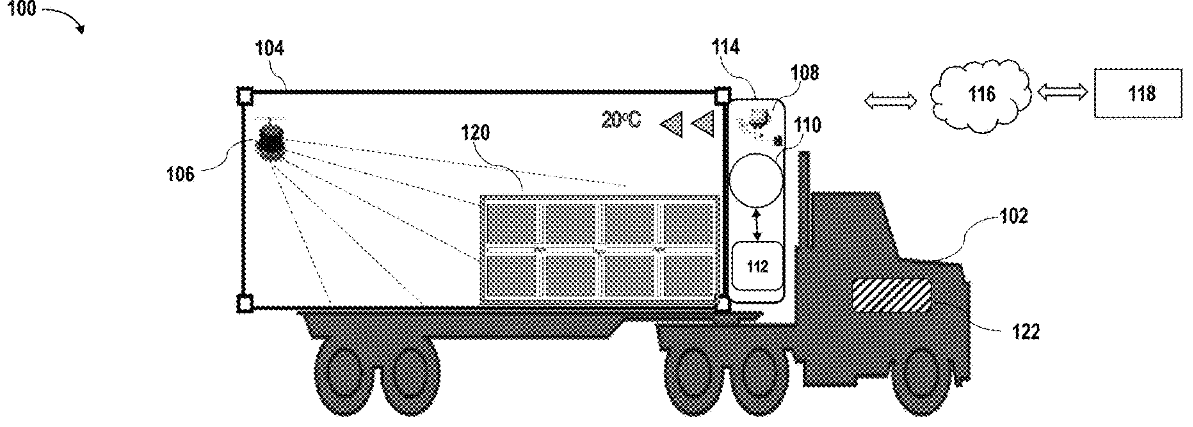
FIG. 1 illustrates a system environment for controlling operation of a transport refrigeration unit of a vehicle.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments disclosed herein provide a method and system for controlling operation of the transport refrigeration unit by setting temperature regulation parameters in a container of a vehicle. Specifically, the disclosed system determines a current amount of cargo load in the container using one or more sensors, such as, but not limited to, Light Detection and Ranging (LiDAR) sensors. Based on the current amount of cargo load (e.g., cargo volume) in the container, the one or more temperature regulation parameters may be set or adjusted, thereby providing an energy efficient system and method for operating the refrigeration system associated with the container. Thus, based on the monitoring of cargo volume, the temperature regulation parameters may be adjusted in real-time which optimizes and ensures efficient operation of the refrigeration system and also avoids overconsumption, thereby improving temperature regulation around a set point.

Further, the embodiments disclosed herein also provide a method and system for controlling operation of the transport refrigeration unit by monitoring a current concentration level of a type of refrigerant in the container (i.e., a refrigerant leak in the container). If the current concentration is more than a predefined threshold level, a specific security mode may be selected. Each security mode of the plurality of security modes is indicative of a specific security trigger mechanism based on the determined current amount of the cargo load in the container and a determination that the current concentration level is more than the predefined threshold concentration level. Accordingly, the level of security is dynamically modified based on a specific type of refrigerant and further based on the detected concentration level, thereby ensuring minimal disruption to the vehicle's operation/trip.

Embodiments of the disclosure will be described below in detail with reference to the accompanying drawings.

FIG. 1 illustrates a system environment 100 for controlling operation of a transport refrigeration unit 114 of a vehicle 102. In a non-limiting example, the vehicle 102 may be a petrol vehicle, a diesel vehicle, a compressed natural gas (CNG) vehicle, an electric vehicle, and the like. The system environment 100 may include the vehicle 102, a communication network 116, and a server 118.

The vehicle 102 may further comprise a container 104, a sensor 106, the transport refrigeration unit 114, and an Electronic Control Unit (ECU) 122. The container 104 may refer to shipping containers, trailers, intermodal shipping containers, marine containers, trucks, and/or other receptacles that can be used to store and/or transport goods by road, rail, air, or sea. The container 104 may be refrigerated or non-refrigerated. "Cargo" and "cargo load" may refer to items located inside the container 104, items to be loaded (placed) inside the container 104, and/or items unloaded (removed) from the container 104.

The vehicle 102 comprises a transport refrigeration unit 114 coupled with the container 104. The ECU 122 may be coupled to the transport refrigeration unit 114 and an engine (not shown) of the vehicle 102. In a non-limiting example, the vehicle 102 comprises cargo load 120 which may be refrigerated during the transportation of goods in the cargo load 120. The cargo load 120 may include one or more perishable goods/items that are to be transported from one location to another.

According to an embodiment, the transport refrigeration unit 114 may further comprise a refrigerant sensor 108, a compressor 110, and a power supply unit 112. The transport refrigeration unit 114 may be configured to cool the container 104. The compressor 110 may correspond to a cooling compressor. In addition to the compressor 110, the transport refrigeration unit 114 may also comprise a cooling fan (not shown) to cool the container 104, and a heating device for defrosting and heating the container 104. The heating device may correspond to at least one of a heating compressor or an electrical heater. As an example, a type of the compressor 110 depends on the transport refrigeration unit 114 and may vary depending upon a type of the container 104.

During the driving mode of the vehicle 102, the engine is configured to provide power to the transport refrigeration unit 114 through the power supply system 112 so that the transport refrigeration unit 114 can maintain one or more temperature regulation parameters of the container 104. The temperature regulation parameters may include cooling parameters of the vehicle 102, which may further include at least one of temperature inside the vehicle 102, humidity inside the vehicle 102, fresh air ventilation inside the vehicle 102, parameters associated with a drain outlet motor of the vehicle 102, defrost rate, and dehumidification. Further, the controlling of temperature regulation parameters may correspond to a cooling capacity, air flow, bet point accuracy, and fuel burn in the vehicle 102. As the cargo load 120 may include perishable goods, the transport refrigeration unit 114 may be configured to maintain appropriate one or more temperature regulation parameters inside the container 104. In one embodiment, the aforementioned temperature regulation parameters may be determined based on a current amount of cargo load 120 in the container 104, thereby facilitating a decrease in energy consumption associated with fuel, gas, and electricity, along with providing a better temperature control. The current amount of cargo load 120 may be determined based on information received from the sensor 106. The amount of cargo load 120 may correspond to a current volume of cargo or an area occupied by the cargo of the total capacity of the container 104. In an embodiment, the sensor 106 may include one of 3D light detection and ranging (LiDAR) sensor, a return air sensor, and a supply air sensor. LiDAR sensor scanning, also known as laser scanning or 3D scanning, may be used for measuring an exact distance of the sensor from an object, such as cargo load 120 in the container 104. Specifically, the sensor 106 may include a system/module to determine a time duration taken for one or more beams of light, transmitted through the LiDAR, to hit an object or surface and reflect to a laser scanner in the LiDAR system. The distance may then be calculated using the velocity of light. Such measurements are known as "Time of Flight" measurements. While FIG. 1 depicts only one sensor 106, it may be understood by a person skilled in the art that more than one sensor 106 may be present in the container 104 to determine the current amount of the cargo load 120 in the container 104.

The sensor 106 may be configured to provide information, associated with the current amount of the cargo in the container 104 to be determined based on the distance of one or more objects (e.g., boxes) related to the cargo load 120 from the position of the sensor 106, to at least one processor/controller of the transport refrigeration unit 114 or the ECU 122. The information may include the time of flight measurements or reflected signals as received at the sensor 106 in response to the transmission of signals from the sensor 106. In response to the reception of the information from the sensor 106, the processor/controller associated with the ECU 122 or the transport refrigeration unit 114, in conjunction with the server 118, may be configured to determine the volume/current amount of the cargo load 120 in the container 104 of the vehicle 102. In one or more embodiments, the exchange of information between the sensor 106 and the transport refrigeration unit 114 or ECU 122 may be performed using one or more of Controller Area Network (CAN®) bus, a wireless network (e.g., Wireless Fidelity (Wi-Fi®) or Bluetooth®), or analogic command through variable voltage.

In one embodiment, the temperature regulation parameters may be dynamically adjusted based on any change in the current amount (e.g., volume) of cargo load 120 determined in real-time. Accordingly, when the cargo is loaded or unloaded from the container 104, the temperature regulation parameters may be adjusted based on the volume of cargo load 120 measured in real-time.

In one or more embodiments, the sensor 106 may be used alone or in combination with other transport refrigeration unit sensors or vehicle data communicated through vehicle 102 or a trailer communication device. In an embodiment where LiDAR sensors are used alone for determining the amount of the cargo load 120, one or more LiDAR sensors may be positioned can be anywhere inside the container 104 where the goods are loaded in the vehicle 102. In another embodiment, the LiDAR sensor(s) may be used with a Return Air Sensor (RAT) or a Supply Air Sensor (SAT) from an evaporator. In another embodiment, the LiDAR sensor may be used in combination with a camera (e.g., a thermal camera) installed within the container 104 of the vehicle 102. In another embodiment, the LiDAR sensor may be used in combination with vehicle data, such as tyre pressure, weight data on axle, vehicle's operation status, door opening information (from transport refrigeration unit 114 or the vehicle 102), Global Positioning System (GPS®) data, Central Processing Unit (CPU®) of vehicle 102, or cloud data associated with planned journey and stops, vehicle battery state of operation and consumption, and clock time. For instance, the sensor 106 may be configured to determine the amount/volume of cargo load 120, and the weight data on axle may be used to determine mass of the cargo load 120. Thus, the combination of sensor 106 and the weight data on axle may be used to determine a density of the cargo load 120, and the refrigeration operation may be adjusted accordingly. Similarly, using a trailer communication device, it may be determined that the door is open while the amount/volume of cargo load 120 may be determined through the sensor 106. The combined information may be used to limit the cooling capacity of the transport refrigeration unit 114. In yet another embodiment, the LiDAR sensor may be used in conjunction with a humidity sensor to determine the amount of cargo load 120. In yet another embodiment, the LiDAR sensor may be used in combination with Radio Frequency Identification (RFID) information from goods containers to transport refrigeration unit 114 (e.g., type of goods, temperature request, humidity request, etc.).

As widely known in the art, in most compressor technologies, a lower speed corresponds to less cooling capacity but provides higher efficiency. The disclosure provides a solution to optimize energy consumption in the transport refrigeration unit 114 based on whether the container 104 is empty, full, half full, etc. When the container 104 is empty, the operation of transport refrigeration unit 114 is controlled to keep the temperature controlled, so a lower consumption may be triggered or which requires pulling down a hot load to detect a high. Specifically, if the sensor of the transport refrigeration unit determines that it may not be feasible to reach the set point, and upon determining that the container 104 is full, it may be concluded that the cargo load 120 has been loaded "hot" (i.e., not at the set point). In such a scenario, a special boost may be activated at the transport refrigeration unit to reach the set point. Similarly, for the evaporator fan in the transport refrigeration unit 114, a lower speed involves lower consumption, thereby providing better efficiency.

In an embodiment where the LiDAR sensor(s) are used alone, the control operation of temperature may be performed based on maintaining less air flow and/or less cooling for a low volume (e.g., 0-50% volume), unless the temperature deviation is too high (i.e., a deviation of up to 3 degrees Celsius), in which case the system may be overridden with higher cooling and airflow.

In one embodiment, the cargo load measured using LiDAR sensor(s) may be used along with a customer selection of a temperature control mode to control the operation of transport refrigeration unit 114. The customer selection may be performed using a user interface provided by the transport refrigeration unit 114 or the ECU 122. For example, the customer may choose to increase/decrease cooling, when the cargo volume is full/empty and vice-versa depending on specific requirement(s). Further, the customer may select a type of product using the user interface of the transport refrigeration unit 114 or ECU 122 to run a predefined program. For instance, flowers may need a high air flow when the box is fully combined with a lower compressor speed t.

In another embodiment, the sensor information may be used along with the weight information from truck/trailer vehicle data or from a dedicated sensor to determine density associated with the cargo load 120. The control operation of the transport refrigeration unit 114 may be performed by establishing a type of transported goods based on sensor data and the weight information. For example, the control operation of the transport refrigeration unit 114 may include a cooling strategy based on low density related to vegetables and high density related to meat.

In another embodiment, a higher efficiency in the operation control of the transport refrigeration unit 114 may include using the sensor 106 to override basic functions, for instance, keeping the transport refrigeration unit 114 running ON with a very low fair flow while doors of the container/vehicle are open. Another example includes stopping the transport refrigeration unit 114 when the sensor 106 detects that there is no remaining cargo inside and GPS®/route data confirms that the defined journey has ended (with the possibility from the driver to override and keep the transport refrigeration unit 114 ON).

Further, the temperature regulation parameters may be set or adjusted by the transport refrigeration unit 114 before a specific transit trip of the perishable goods. In another embodiment, the temperature of the container 104 may also be set manually by the user of the vehicle 102 before the start of the specific transit trip of the perishable item or during the transit trip.

According to an embodiment, the ECU 122 of the vehicle 102 may comprise one or more controllers (not shown in FIG. 1) configured to control the overall operation mode of the vehicle 102. Further, the ECU 122 may be configured to communicate wirelessly with the server 118 via the communication network 116. According to an embodiment, the ECU 122 may be configured to obtain, from the transport refrigeration unit 114, real time temperature data. Further, the ECU 122 may be configured to receive the real time sensor data from the sensor 106 to determine the temperature regulation parameters for the container 104 based on the current amount of cargo load 120. According to an embodiment, the server 118 may be configured to receive such temperature and sensor data to determine the temperature regulation parameters. The aforesaid information may be alternatively referred to as first input information, throughout the disclosure without deviating from the scope of the invention.

In an embodiment, the refrigerant sensor 108 may be configured to monitor a current concentration level of a type of refrigerant being used in the vehicle 102. While the refrigerant sensor 108 is depicted as a part of transport refrigeration unit 114, it may be understood that the refrigerant sensor 108 may be outside the transport refrigeration unit 114, but inside the container 104 to detect any refrigerant leak. The processor/controller associated with the ECU 122 or the transport refrigeration unit 114 may be configured to obtain the information associated with refrigerant data detected by the refrigerant sensor 108. Further, if the current concentration is more than a predefined threshold level and/or further based on the determined cargo load 120, the ECU 122 may be configured to select a specific security mode. Each security mode of the plurality of security modes is indicative of a specific security trigger mechanism based on the determined current amount of the cargo load 120 in the container 104 and a determination that the current concentration level is more than the predefined threshold concentration level. Accordingly, the level of security is dynamically modified based on a specific type of refrigerant, detected concentration level, and the cargo volume, thereby ensuring minimal disruption to the vehicle's operation/trip. In another embodiment, the current concentration level may be compared to more than one predefined threshold concentration levels, wherein each predefined threshold level may be associated with a different security trigger mechanism.

In an embodiment, the LiDAR sensor data may be combined with the refrigerant sensor 108 (e.g., A2L or A3 sensor) for controlling the operation of transport refrigeration unit 114 of the vehicle 102. If the refrigerant sensor 108 triggers a shutdown threshold limit, the fans in the transport refrigeration unit 114 may be switched ON to brass the air. Further, if the sensor 106 determines that the container 104 is empty (i.e., cargo load 120 is zero) and A2L/A3 sensor 108 is not active anymore, then it may be determined that there is no more risk and a security mode corresponding to no action may be selected. However, if the sensor 106 determines that the container 104 is empty and the refrigerant sensor 108 is still active, at a predefined limit, the security mode selection may only correspond to triggering an alarm of inspection. Further, if the sensor 106 determines that the container 104 is near its total capacity, and the refrigerant sensor 108 is not active anymore, at a predefined limit, the security mode selection may only correspond to trigger an alarm of inspection. Further, if the sensor 106 determines that the container 104 is near its total capacity, and the refrigerant sensor 108 is still active, the security mode selection may only correspond to triggering a unit shut down or pump down.

In various embodiments, the selection of security modes based on the volume of cargo, a predefined threshold limit of refrigerant, and/or the type of refrigerant brings a finer level of tuning for the trigger points which avoids useless shutdowns (e.g., if the container 104 is empty, the risk of a thermal event becomes even lower).

Conventional refrigerant sensors (e.g., A2L sensor) estimate a percentage of A2L leaks around the sensor inside the riskiest source of energy (such as the evaporator fans or electrical heaters). Once all the refrigerant is leaking, the refrigerant being heavier tends to stay on the ground and the refrigerant sensor might come back to a state below the trigger point of shut down of the transport refrigeration unit 114. Thus, without the sensor 106, the air needed to be removed to try to estimate a percentage of refrigerant inside the compartment. However, according to one or more embodiments, with the sensor 106, based on the volume set initially with respect to the actual volume of cargo load 120 in the container 104, the remaining volume in the container 104 may be determined. Further, based on the estimated remaining volume as well as the volume of cargo load 120, it may be estimated if there is still an actual risk of the thermal event or not, thereby avoiding useless shutdowns.

Figure 4:
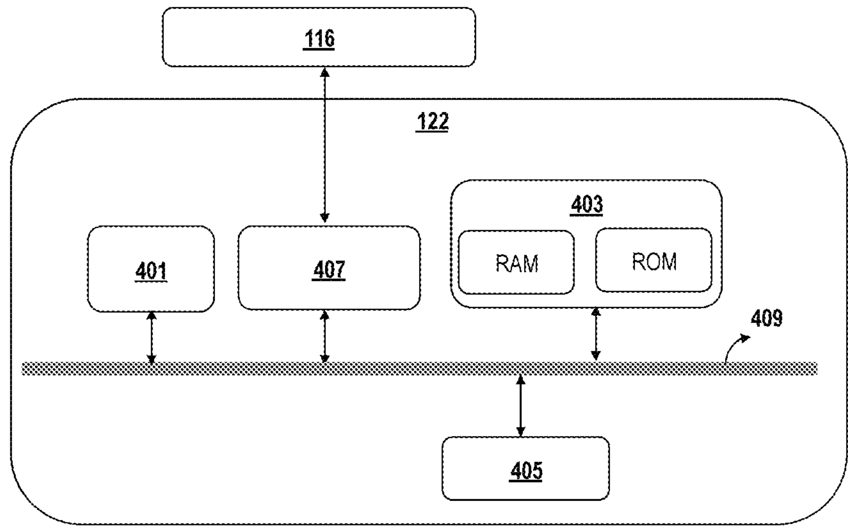
FIG. 4 illustrates an example block diagram of the ECU of the vehicle.

The power supply unit 112 may be configured for powering the compressor 110. The power supply unit 112 comprises a controller (not shown) configured to control the operation of the power supply unit 112 to provide power to the compressor 110 and the cooling fan. The controller may be configured to operate the power supply unit 112 to continuously draw power from the engine to operate the compressor 110 and the cooling fan to maintain a temperature environment within the container 104 based on the current amount of cargo load 120. The controller may be configured to communicate with the ECU 122 via a Controller Area Network (CAN) bus (not shown in FIG. 1). The CAN bus is commonly used in relation to vehicle systems and, advantageously, the controller of the power supply system 112 can make use of a pre-existing bus connection of the vehicle 102. According to an embodiment, in addition to the reception of the data from the sensor 106, the ECU 122 may be further configured to receive other data related to temperature data, humidity data, location data, and the like. The container 104 and/or the transport refrigeration unit 114 may also include a plurality of sensors (not shown) to measure temperature and pressure inside the container 104. The plurality of sensors may include, but not limited to, a compressor discharge and suction pressure measurement sensors, temperature sensors, evaporator leaving temperature sensors, and supply, return, and ambient air temperature sensors, gas sensors, ethylene sensors, and the like. The ECU 122 may further comprise a transceiver (e.g., a communication interface as shown in FIG. 4) that provides various real time data to the server 118 to determine the temperature regulation parameters.

In a further non-limiting example, the real time temperature data may include the internal air temperature value of the container 104 that may be obtained from a data logger, the transport refrigeration unit 114, or sensors that are installed outside the transport refrigeration unit 114 or the container 104.

In a non-limiting example, the information related to the cargo load 120 may also include data related to the arrangement pattern of the perishable items inside the container 104, a packaging of the perishable items, a quantity/volume of the perishable items loaded inside the vehicle, and/or a loading pattern of the perishable items.

In a non-limiting example, the type of the vehicle 102 referred to herein, may correspond to one of an electric vehicle, hybrid vehicle, CNG-based vehicle, petrol vehicle, diesel vehicle, and the like. In a yet further non-limiting example, the size of the vehicle 102 herein corresponds to a light commercial vehicle (LCV), a light rigid vehicle, a heavy commercial vehicle having a large trailer, a vehicle having a semi-trailer (Articulated Truck), and the like. Further, in a non-limiting example, the volume of the perishable items loaded in the vehicle 102 referred to herein, may indicate the quantity of the perishable items or the cargo loaded in the vehicle 102.

According to an embodiment, the server 118 may correspond to any conventional physical server or a cloud-based server. Various monitoring systems or computer system(s) may access the server 118 via internet or by any wireless communication network/medium 116. The server 118 here refers to any physical server or a virtual server that interacts with one or more computer systems having one or more processors. Such an arrangement may also refer to as a cloud that may be implemented in a scalable manner. As a further example, the processors may be virtually implemented in the server 118.

Figure 2:
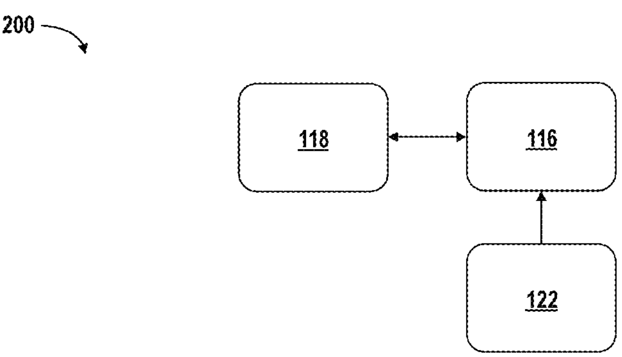
FIG. 2 illustrates another exemplary system environment including one or more components for determining temperature regulation parameters.
Figure 3:
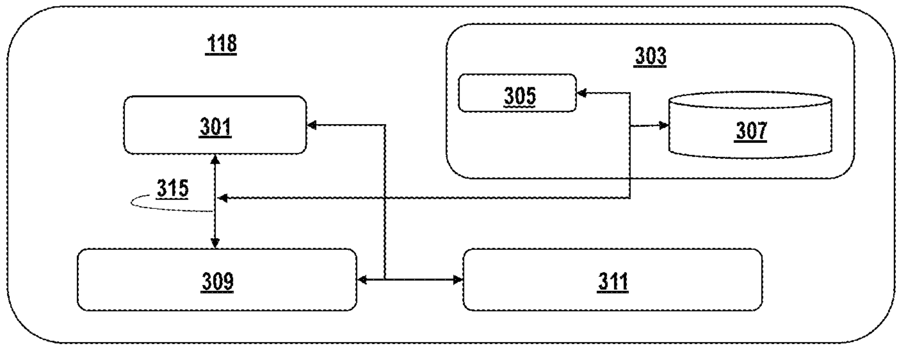
FIG. 3 illustrates a detailed schematic block diagram of the server of FIG. 1.

FIG. 2 illustrates another exemplary system environment 200 including one or more components for determining temperature regulation parameters. FIG. 3 illustrates a detailed schematic block diagram of the server 118 of FIG. 1. FIGS. 2 and 3 are described in conjunction for ease of explanation. The system environment 200 includes the ECU 122 and the server 118 configured to communicate via the communication network 116. The ECU 122 corresponds to an ECU of the vehicle 102.

The ECU 122 corresponds to a hardware system, a software system, or a combination of the hardware and the software designed for determining temperature regulation parameters for the container 104 of the vehicle 102. The ECU 122 may comprise one or more modules or a standalone system connected with the server 118 via the communication network 116 (e.g., a wireless network) to be described later. The ECU 122, in conjunction with the server 118, may perform one or more operations for processing of data received from various sensors, as discussed throughout this disclosure, to determine the amount/volume of cargo load 120 and further determine temperature regulation parameters and trigger security modes for efficient transportation of cargo load 120.

Further, the ECU 122 may be configured to track the real-time location of the vehicle 102 using GPS or other tracking technologies. The ECU 122 may be further configured to collect a wide range of data from one or more sensors in the vehicle 102 and other system components, for example, user dashboard, input devices, etc. installed in the vehicle 102. As a non-limiting example, the collected data may include information associated with fuel consumption, engine performance, driver behaviour, battery State of Charge (SoC), cargo load, and other vehicle parameters.

Further, as shown in FIG. 3, the components of the server 118 may include, but not limited to, one or more processing units (herein 'processor') 301, a memory 303, and communication channel 315 which may take the form of a bus, wired or wireless network, or other forms, that couples various system components including the processor 301 and the memory 303. The server 118 also typically includes a variety of computer system-readable media. Such media may be any available media that is accessible by the server 118, and it includes both volatile and non-volatile media, removable and non-removable media. The server 118 further includes an operation control module 309 and a communication interface 311.

The processor 301 may receive computer-readable program instructions from the memory 303 and execute the received instructions, thereby performing one or more processes or method steps, as discussed throughout the disclosure, and as defined by the server 118. The processor 301 may include any processing hardware, software, or combination of hardware and software utilized by the server 118 that carries out the computer-readable program instructions by performing arithmetical, logical, and/or input/output operations. Examples of the processor 301 may include, but not limited to, an arithmetic logic unit, which performs arithmetic and logical operations, a control unit, which extracts, decodes, and executes instructions from a memory, and an array unit, which utilizes multiple parallel computing elements.

The processor 301 and the operation control module 309 may be configured to control the operation of the transport refrigeration unit 114 by setting/adjusting temperature regulation parameters and triggering various security modes for the cargo load 120 in the container 104 of the vehicle 102. The setting/adjusting of the temperature regulation parameters may correspond to, but not limited to, adjusting the temperature regulation parameters using at least one of a compressor, a modular flow suction valve, a modular flow expansion valve, a bypass valve, and an evaporator fan in the transport refrigeration unit 114 of the vehicle 102. The temperature regulation parameters may include cooling parameters of the vehicle 102, which may further include at least one of temperature inside the vehicle 102, humidity inside the vehicle 102, fresh air ventilation inside the vehicle 102, parameters associated with a drain outlet motor of the vehicle 102, defrost rate, and dehumidification. A description of the operations performed by the processor 301 for controlling the operation of the transport refrigeration unit 114 in the vehicle 102 will be described below with reference to the method flow chart of FIG. 5 of the drawings.

The memory 303 may include a tangible device that retains and stores computer-readable program instructions, as provided by the server 118, for use by the processor 301. The memory 303 may include computer system readable media in the form of volatile memory, such as Random-Access Memory (RAM) 305.

Further, the memory 303 may include a database 307 for storing the temperature regulation parameters of the vehicle 102. The database 307 may also store energy consumption and performance parameters, vehicle type information, and transit information associated with the vehicle 102. The database 307 may correspond to a data storage and management system hosted on the server 118 and is accessible over the internet by the ECU 122.

In a non-limiting example, the memory 303 may be provided for reading from and writing to a non-removable, non-volatile magnetic media (not shown and typically called a "hard drive", either mechanical or solid-state). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each of the memory elements described herein may be connected to the bus 315 by one or more data media interfaces (not shown). As will be further depicted and described below, the memory 303 may include at least one computer program product having a set (e.g., at least one) of program modules that are configured to carry out the operations of embodiments of the disclosure.

The bus 315 represents one or more of any of several types of bus structures, including a memory bus or memory controller, a peripheral bus, an accelerated graphics port, and a processor or local bus using any of a variety of bus architectures.

The operation control module 309 may be configured to receive information from the one or more sensors, determine the amount/volume of cargo load 120, determine the refrigerant concentration in the container 104, and set/adjust the temperature regulation parameters along with generating security triggers, as described throughout the disclosure. The operation control module 309 may also be configured to manage notifications of one or more alerts (e.g., security trigger alerts) for a user of the vehicle 102. The operation control module 309 may also be configured to manage notifications of the one or more alerts for an external device associated with a maintenance team responsible for maintaining the vehicle 102. The one or more alerts may correspond to an alert notification message, voice message, a control signal, or any command generated by the processor 301 to inform at least one of the user of the vehicle 102 and the external device managing the vehicle 102.

The communication interface 311 may be software based or may be a physical connection in hardware. The communication interface 311 may be configured with, but not limited to, Bluetooth®, Wi-Fi®, LoRa®, Zigbee®, and the like. The communication interface 311 may be further configured to connect with a network, external media, a display, or any other components in the system environment 200, or combinations thereof. The connection with the network may be a physical connection, such as a wired Ethernet® connection, or may be established wirelessly. The network may include wired networks, wireless networks, Ethernet® Audio Video Bridging (AVB) networks, or combinations thereof. The wireless network may be a cellular telephone network, 802.11, 802.16, 802.20, 802.1Q, or Worldwide Interoperability for Microwave Access (WiMax®) network. Further, the network may be a public network, such as the internet, a private network, such as an intranet, or a combination thereof, and may utilize a variety of networking protocols now available or later developed networking protocols.

The units, amongst other things, include routines, programs, objects, components, data structures, etc., which perform particular tasks or implement data types. The units may also be implemented as, signal processor(s), state machine(s), logic circuitries, and/or any other device or component that manipulates signals based on operational instructions.

Further, the ECU 122 may include a controlling unit (i.e., a Central Processing Unit (CPU)), one or more sensors, a system memory, a system bus, and a communication interface.

The above-described system environment 200 is an example implementation for setting or adjusting the temperature regulation parameters and triggering a security mode for cargo load 120 in the vehicle 102, as discussed throughout the disclosure, and is not intended to suggest any limitation as to the scope of use or operability of one or more embodiments described herein (indeed additional or alternative components and/or implementations may be used). That is, the system environment 200 and elements therein may take many different forms and include multiple and/or alternate components and facilities. Further, the system environment 200 may include and/or employ any number and combination of computing devices and networks utilizing various communication technologies, as described herein. Regardless, the system environment 200 is capable of being implemented and/or performing any of the operability set forth hereinabove.

FIG. 4 illustrates an example block diagram of the ECU 122 of the vehicle 102. As shown in FIG. 4, the ECU 122 includes a CPU 401, a system memory 403, one or more sensors 405, a communication interface 407, and a system bus 409.

The CPU 401 may be configured for controlling various system components of the vehicle 102. The CPU 401 may essentially be a completely self-contained computing system, containing multiple cores or processors, a bus, a memory controller, a cache, etc. (such as a system-on-chip). A multi-core processor may be symmetric or asymmetric.

The system memory 403 may include a tangible device that retains and stores computer-readable program instructions for use by the CPU 401. The system memory 403 may include computer system readable media in the form of volatile memory, such as Random-Access Memory (RAM). Further, the system memory 403 may also include a non-tangible device including a Read-Only Memory (ROM).

The one or more sensors 405 may be configured to periodically measure vehicle parameters of the vehicle 102. The vehicle parameters include at least one of the British Thermal Unit (BTU) consumption of the vehicle 102, fuel consumption of the vehicle 102, or speed of the vehicle 102. The one or more sensors may include, but not limited to, a fuel level sensor, odometer sensor, engine Revolutions Per Minute (RPM) sensor, throttle position sensor, mass air flow sensor, exhaust gas oxygen sensor, battery SoC sensor, current sensor, voltage sensor, regenerative braking sensor, temperature sensors, acceleration sensors, motion sensors, gyro sensors, air index measurement sensor, intake air temperature sensors, engine coolant temperature sensors, and the like.

The CPU 401 may be configured to periodically share the energy consumption and vehicle performance parameters measured by the one or more sensors to the server 118 via the communication network 116. The sharing of the energy consumption and vehicle performance parameters measured by the one or more sensors to the server 118 on periodic intervals helps in performing better comparison and analysis for setting or modifying the temperature regulation parameters in terms of less BTU and energy consumption.

The communication interface 407 may be connected to a network, such as the wireless network as described above. A detailed description of the wireless network and type of the wireless network is described herein in the above paragraphs. Therefore, a detailed description of the same is omitted herein for the sake of brevity of the disclosure. The communication interface 407 may include a transceiver having a transmitter and a receiver for receiving or transmitting data from or to the server 118.

The system bus 409 may be any of several types of bus structures including a memory bus or memory controller, a peripheral bus, and a local bus using any of a variety of bus architectures. The system memory 403 may correspond to one of a hard disk drive, a magnetic disk drive, an optical disk drive, a tape drive, a solid-state drive, or the like. The system memory 403 may include software modules that can be controlled and executed by the CPU 401. Other hardware or software modules may also be contemplated. The system memory 403 may be connected to the ECU 122 by a drive interface. The drives and the associated computer-readable storage media provide non-volatile storage of computer-readable instructions, data structures, program modules, and other data for the ECU 122.

Figure 5:
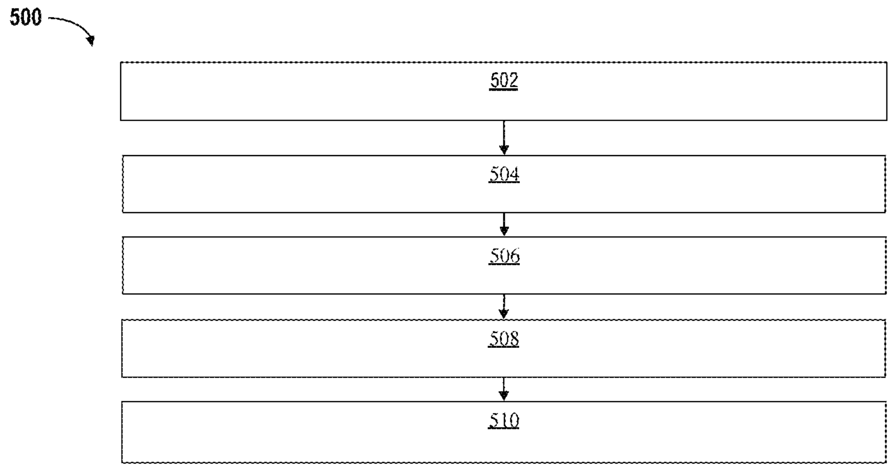
FIG. 5 illustrates a process flow depicting a method for controlling operation of a transport refrigeration unit of a vehicle.

FIG. 5 illustrates a process flow depicting a method 500 for controlling operation of the transport refrigeration unit 114 of the vehicle 102.

At step 502, the method 500 comprises receiving first input information from at least one sensor positioned inside the container 104. In one or more embodiments, the at least one sensor comprises a 3D light detection and ranging (LiDAR) sensor, a return air sensor, and a supply air sensor.

At step 504, the method 500 comprises determining a current amount of the cargo load 120 in the container 104 based on the received first input information from the at least one sensor. In one or more embodiments, the determination may include determining the current amount of cargo load 120 in the container 104 based on a distance of one or more objects associated with the cargo load 120 from a position of the at least one sensor inside the container 104, wherein the distance is determined based on a time of flight measurement of a signal transmitted from the at least one sensor towards the one or more objects associated with the cargo load 120.

At step 506, the method 500 comprises one or more of receiving second input information, third input information, and fourth input information. The second input information may be received from at least one refrigerant sensor positioned inside the container 104 of the vehicle 102. In one or more embodiments, the second input information is indicative of a current concentration level of a type of a refrigerant being used in the vehicle 102. In one or more embodiments, the third input information may be associated with a current trip route and a current location of the vehicle 102. In one or more embodiments, the fourth input information may be associated with a cargo weight and a cargo type inside the container 104 of the vehicle 102.

At step 508, the method 500 comprises controlling operation of the transport refrigeration unit 114 by setting or adjusting one or more temperature regulation parameters for the container 104 based on the determined current amount of cargo load 120 in the container 104. In one or more embodiments, the setting or adjusting the one or more temperature regulation parameters may be performed based on controlling operation of at least one of a compressor, a modular flow suction valve, a modular flow expansion valve, a bypass valve, and an evaporator fan in the transport refrigeration unit 114 of the vehicle 102.

In response to receipt of the third input information, the controlling operation of the transport refrigeration unit 114 may include setting or adjusting the one or more temperature regulation parameters for the container 104 based on the determined current amount of the cargo load 120 and the third input information.

In response to receipt of the fourth input information, the controlling operation of the transport refrigeration unit 114 may include setting or adjusting the one or more temperature regulation parameters for the container 104 based on the determined current amount of the cargo load 120 and the fourth input information.

At step 510, the method 500 comprises processing the second input information to determine whether the current concentration level of the type of the refrigerant is more than a predefined threshold concentration level for the type of the refrigerant. Upon determining that the current concentration level of the type of the refrigerant is more than a predefined threshold concentration level for the type of the refrigerant, thereby indicating a refrigerant leakage, the controlling operation of the transport refrigeration unit 114 may include selecting a security mode, among a plurality of security modes, may be selected. Each security mode of the plurality of security modes is indicative of a specific security trigger mechanism based on the determined current amount of the cargo load 120 in the container 104 and a determination that the current concentration level is more than the predefined threshold concentration level. In one or more embodiments, the plurality of security modes comprises an alarm based first security trigger mechanism, a second security trigger mechanism involving shutting down of the transport refrigerated unit in the vehicle, and a third security trigger mechanism for pumping down the refrigerant.

While the above steps of FIG. 5 are shown and described in a particular sequence, the steps may occur in variations to the sequence in accordance with various embodiments of the disclosure. Further, the details related to various steps of FIG. 5, which are already covered in the description related to FIGS. 1-4 are not discussed again in detail here for the sake of brevity.

Figures 6A, 6B:
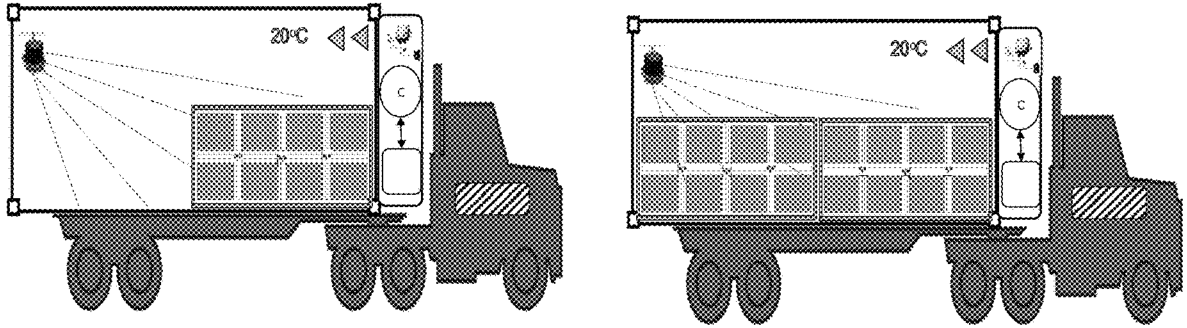
FIGS. 6A and 6B illustrate example use cases associated with controlling the operation of the transport refrigeration unit of the vehicle.

FIGS. 6A and 6B illustrate use cases associated with controlling the operation of the transport refrigeration unit 114 of the vehicle 102. As depicted in FIGS. 6A and 6B, the container 104 may be loaded at 50% and 100% of the total capacity of the cargo load 120, respectively, and the sensor 106 may be used to monitor the container volume. Through this data availability, the refrigeration unit may be able to adapt its cooling capacity and air flow. Consequently, the energy consumption will decrease and a better temperature control with respect to conventional solutions may be achieved using the aforementioned methodology of controlling the temperature regulation parameters of the disclosure.

In contrast, in conventional methodologies, the operation of previously existing transport refrigeration units is based on a temperature difference between the set point and the current temperature. In such a scenario, the transport refrigeration unit usually operates at maximum cooling capacity at full air flow, thereby maximizing energy consumption. This conventional operation also results in poor temperature control.

Further, as depicted in FIGS. 6A and 6B, the container 104 may be loaded at 50% and 100% of the cargo load 120 respectively, and the refrigerant sensor 108 may be used to monitor the concentration of refrigerant (i.e., any leak of refrigerant) in the container 104. The disclosure provides a mechanism for controlling the operation of the transport refrigeration unit 114 based on the type of refrigerant (e.g., A2L or A3) and LFL calculation and considering the cargo volume. When the cargo load 120 is 100% and the LFL limit is reached, the transport refrigeration unit 114 may be shutdown. However, when the cargo load 120 is 50% and the LFL limit is not reached, the disclosure selects a security level associated with an alarm only with no unit shutdown, thereby ensuring cargo safety and cold chain performance.

Thus, the disclosure provides several advantages over the conventional controls by setting or adjusting the temperature regulation parameters based on the monitored amount/volume of cargo load 120 in the container 104. Specifically, the key advantages related to more accurate temperature control, optimization of energy consumption, improved efficiency, decreased TCO, and avoiding loss of perishable cargo due to efficient temperature control. Further, the efficient triggering of security modes also facilitates in optimizing and ensuring the right level of safety for various types of refrigerants over the conventional solutions.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for controlling operation of a Transport Refrigeration Unit (TRU) of a vehicle, the vehicle comprising a container configured to store cargo, the method comprising:

receiving first input information from at least one sensor positioned inside the container;

determining a current amount of cargo load in the container based on the received first input information from the at least one sensor; and controlling operation of the TRU by setting one or more temperature regulation parameters for the container based on the determined current amount of cargo load in the container.

2. The method of claim 1, wherein the determining comprises determining the current amount of cargo load in the container based on a distance of one or more objects associated with the cargo load from a position of the at least one sensor inside the container, wherein the distance is determined based on a time of flight measurement of a signal transmitted from the at least one sensor towards the one or more objects associated with the cargo load.

3. The method of claim 1, wherein controlling operation of the TRU comprises setting the one or more temperature regulation parameters by controlling operation of at least one of a compressor, a modular flow suction valve, a modular flow expansion valve, a bypass valve, and an evaporator fan in the TRU of the vehicle.

4. The method of claim 1, further comprising:

receiving second input information from at least one refrigerant sensor positioned inside the container, the second input information being indicative of a current concentration level of a type of a refrigerant being used in the vehicle; and processing the second input information to determine whether the current concentration level of the type of the refrigerant is more than a predefined threshold concentration level for the type of the refrigerant.

5. The method of claim 4, wherein controlling operation of the TRU further comprises selecting a security mode among a plurality of security modes, wherein each security mode of the plurality of security modes is indicative of a specific security trigger mechanism based on the determined current amount of the cargo load in the container and a determination that the current concentration level is more than the predefined threshold concentration level.

6. The method of claim 5, wherein the plurality of security modes comprises an alarm based first security trigger mechanism, a second security trigger mechanism involving shutting down of the TRU, and a third security trigger mechanism for pumping down the refrigerant.

7. The method of claim 1, wherein the at least one sensor comprises a 3D light detection and ranging (LiDAR) sensor, a return air sensor, and a supply air sensor.

8. The method of claim 1, further comprising:

receiving third input information associated with a current trip route and a current location of the vehicle, wherein controlling operation of the TRU comprises setting the one or more temperature regulation parameters for the container based on the determined current amount of the cargo load and the third input information.

9. The method of claim 1, further comprising:

receiving fourth input information associated with a cargo weight and a cargo type inside the container of the vehicle, wherein controlling operation of the TRU comprises setting the one or more temperature regulation parameters for the container based on the determined current amount of the cargo load and the fourth input information.

10. A system for controlling operation of a Transport Refrigeration Unit (TRU) of a vehicle, the vehicle comprising a container configured to store cargo, the system comprising:

at least one sensor positioned inside the container of the vehicle; and at least one processor communicably coupled to the at least one sensor, wherein the at least one processor is configured to:

receive first input information from the at least one sensor positioned inside the container;

determine a current amount of cargo load in the container based on the received first input information from the at least one sensor; and control operation of the TRU by setting one or more temperature regulation parameters for the container based on the determined current amount of cargo load in the container.

11. The system of claim 10, wherein the at least one processor is further configured to determine the current amount of cargo load in the container based on a distance of one or more objects associated with the cargo load from a position of the at least one sensor inside the container, wherein the distance is determined based on a time of flight measurement of a signal transmitted from the at least one sensor towards the one or more objects associated with the cargo load.

12. The system of claim 10, wherein the at least one processor is further configured to control operation of the TRU by setting the one or more temperature regulation parameters based on controlling operation of at least one of a compressor, a modular flow suction valve, a modular flow expansion valve, a bypass valve, and an evaporator fan in the TRU of the vehicle.

13. The system of claim 10, wherein the at least one processor is further configured to:

receive second input information from at least one refrigerant sensor positioned inside the container, the second input information being indicative of a current concentration level of a type of a refrigerant being used in the vehicle; and process the second input information to determine whether the current concentration level of the type of the refrigerant is more than a predefined threshold concentration level for the type of the refrigerant.

14. The system of claim 13, wherein to control operation of the TRU, the at least one processor is further configured to select a security mode among a plurality of security modes, wherein each security mode of the plurality of security modes is indicative of a specific security trigger mechanism based on the determined current amount of the cargo load in the container and a determination that the current concentration level is more than the predefined threshold concentration level.

15. The system of claim 14, wherein the plurality of security modes comprises an alarm based first security trigger mechanism, a second security trigger mechanism involving shutting down of the TRU, and a third security trigger mechanism for pumping down the refrigerant.

16. The system of claim 10, wherein the at least one sensor comprises a 3D light detection and ranging (LiDAR) sensor, a return air sensor, and a supply air sensor.

17. The system of claim 10, wherein the least one processor is further configured to:

receive third input information associated with a current trip route and a current location of the vehicle; and control operation of the TRU by setting the one or more temperature regulation parameters for the container based on the determined current amount of the cargo load and the third input information.

18. The system of claim 10, wherein the least one processor is further configured to:

receive fourth input information associated with a cargo weight and a cargo type inside the container of the vehicle, and control operation of the TRU by setting the one or more temperature regulation parameters for the container based on the determined current amount of the cargo load and the fourth input information.

* * * * *